United States Patent
Jezewski

(10) Patent No.: US 10,484,170 B2
(45) Date of Patent: Nov. 19, 2019

(54) CUSTOM ENCRYPTION FUNCTION FOR COMMUNICATIONS BETWEEN A CLIENT DEVICE AND A SERVER DEVICE

(71) Applicant: Capital One Services, LLC, McLean, VA (US)

(72) Inventor: Joni Bridget Jezewski, Fairfax, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/181,812

(22) Filed: Nov. 6, 2018

(65) Prior Publication Data

US 2019/0253237 A1 Aug. 15, 2019

Related U.S. Application Data

(63) Continuation of application No. 15/896,933, filed on Feb. 14, 2018, now Pat. No. 10,153,897.

(51) Int. Cl.
*H04L 9/08* (2006.01)
*G06F 21/60* (2013.01)
(Continued)

(52) U.S. Cl.
CPC ............ *H04L 9/0819* (2013.01); *G06F 7/582* (2013.01); *G06F 21/602* (2013.01);
(Continued)

(58) Field of Classification Search
CPC ....... H04L 9/08; H04L 9/0819; H04L 9/0822; H04L 9/083; H04L 9/0833; H04L 9/0891;
(Continued)

(56) References Cited

U.S. PATENT DOCUMENTS 6,671,810 B1 12/2003 Jardin
8,050,401 B2 11/2011 Kohnen
(Continued)

FOREIGN PATENT DOCUMENTS

WO 2000052875 A1 9/2000

OTHER PUBLICATIONS

Co-pending U.S. Appl. No. 15/896,933, filed Feb. 14, 2018, entitled "Custom Encryption Function for Communications Between a Client Device and a Server Device", by Joni Bridget Jezewski, 58 pages.
(Continued)

*Primary Examiner* — Huan V Doan
(74) *Attorney, Agent, or Firm* — Harrity & Harrity, LLP

(57) ABSTRACT

A device receives credentials of a user of a client device that is accessing an application associated with a server device, and verifies the user based on the credentials of the user. The device retrieves, based on verifying the user, a random function from a random functions data structure associated with the device, and utilizes the random function to select parameters and values for a user function. The device utilizes the user function, the parameters, and the values to generate a custom encryption function, and encrypts the custom encryption function to form an encrypted custom encryption function. The device provides the encrypted custom encryption function to the client device and the server device to permit encrypted communication between the client device and the server device using the custom encryption function.

20 Claims, 10 Drawing Sheets

(51) Int. Cl.
*G06F 7/58* (2006.01)
*H04L 29/06* (2006.01)
*G06F 21/62* (2013.01)
*H04L 9/30* (2006.01)
*H04L 9/06* (2006.01)

(52) U.S. Cl.
CPC ........ *G06F 21/6218* (2013.01); *H04L 9/0631* (2013.01); *H04L 9/083* (2013.01); *H04L 9/0833* (2013.01); *H04L 9/302* (2013.01); *H04L 9/3013* (2013.01); *H04L 9/3066* (2013.01); *H04L 63/083* (2013.01); *H04L 63/0428* (2013.01)

(58) Field of Classification Search
CPC ..... H04L 9/0631; H04L 9/3013; H04L 9/302; H04L 63/083; H04L 63/0428; G06F 7/582; G06F 21/6218; G06F 21/62; G06F 21/602
See application file for complete search history.

(56) References Cited

U.S. PATENT DOCUMENTS

| | | |
|---|---|---|
| 2008/0292101 A1 | 11/2008 | Macchi |
| 2008/0304664 A1 | 12/2008 | Suthaharan |
| 2010/0211787 A1 | 8/2010 | Bukshpun |
| 2013/0083926 A1 | 4/2013 | Hughes |
| 2017/0070483 A1 | 3/2017 | Sammet |
| 2018/0063094 A1* | 3/2018 | Albrecht ............. H04L 63/0435 |
| 2019/0007209 A1* | 1/2019 | Ruan ....................... H04L 9/302 |
| 2019/0149320 A1* | 5/2019 | Keselman ............... H04L 9/083 380/279 |

OTHER PUBLICATIONS

Dabhade et al., Data Security in Cloud Using Aggregate Key and Diffie-Hellman Algorithm, 18 pages (Year: 2015).

Chow et al., White-Box Cryptography and an AES Implementation, 18 pages (Year: 2005).

* cited by examiner

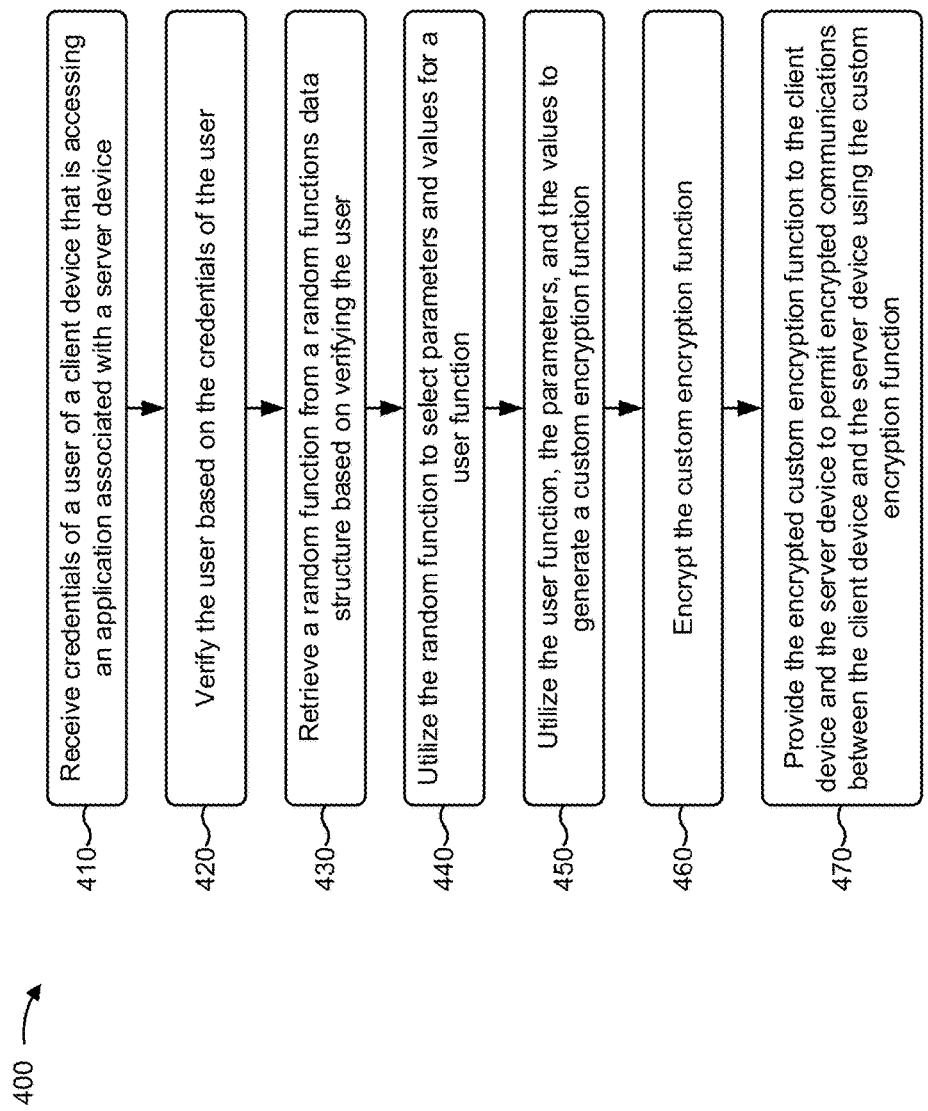

CUSTOM ENCRYPTION FUNCTION FOR COMMUNICATIONS BETWEEN A CLIENT DEVICE AND A SERVER DEVICE

RELATED APPLICATION

This application is a continuation of U.S. patent application Ser. No. 15/896,933, filed Feb. 14, 2018, which is incorporated herein by reference.

BACKGROUND

A variety of private information (e.g., financial information, personal information, and/or the like) is exchanged over computer networks (e.g., the Internet) by entities, and is susceptible to theft. Thus, various security techniques are utilized to protect the private information that is exchanged over the computer networks.

SUMMARY

According to some implementations, a device may include one or more memories, and one or more processors, communicatively coupled to the one or more memories, to receive credentials of a user of a client device that is accessing an application associated with a server device, and verify the user based on the credentials of the user. The one or more processors may retrieve, based on verifying the user, a random function from a random functions data structure associated with the device, and may utilize the random function to select parameters and values for a user function. The one or more processors may utilize the user function, the parameters, and the values to generate a custom encryption function, and may encrypt the custom encryption function to form an encrypted custom encryption function. The one or more processors may provide the encrypted custom encryption function to the client device and the server device to permit encrypted communication between the client device and the server device using the custom encryption function.

According to some implementations, a method may include receiving, by a device, information associated with a user of a client device that is accessing an application associated with a server device, wherein the information associated with the user may indicate that the user wishes to encrypt data to be shared with the application, and may include credentials of the user. The method may include verifying, by the device, the user based on the credentials of the user, and utilizing, by the device and based on verifying the user, a random function to select parameters and values for a user function. The method may include executing, by the device, the user function based on the parameters and the values; and selecting, by the device and based on executing the user function, one or more encryption functions. The method may include selecting, by the device and based on executing the user function, one or more ciphers, and utilizing, by the device and based on executing the user function, one or more operations with the one or more encryption functions and the one or more ciphers to generate a custom encryption function. The method may include providing, by the device, information identifying the custom encryption function to the client device and the server device to permit encrypted communication between the client device and the server device using the custom encryption function.

According to some implementations, a non-transitory computer-readable medium may store instructions that include one or more instructions that, when executed by one or more processors, cause the one or more processors to receive credentials of a user of a client device that is accessing an application associated with a server device, and verify the user based on the credentials of the user. The one or more instructions may cause the one or more processors to retrieve, based on verifying the user, a random function from a random functions data structure, and execute the random function. The one or more instructions may cause the one or more processors to select, based on executing the random function, parameters and values for a user function, and store the user function, the parameters, and the values in a user functions data structure. The one or more instructions may cause the one or more processors to utilize the user function, the parameters, and the values to generate a custom encryption function, and provide information associated with the custom encryption function to the client device and the server device to permit encrypted communication between the client device and the server device using the custom encryption function. The one or more instructions may cause the one or more processors to remove the user function, the parameters, and the values, from the user functions data structure after the information associated with the custom encryption function is provided to the client device and the server device.

BRIEF DESCRIPTION OF THE DRAWINGS

FIG. 4 is a flow chart of an example process for providing a custom encryption function for communications between a client device and a server device.

DETAILED DESCRIPTION

The following detailed description of example implementations refers to the accompanying drawings. The same reference numbers in different drawings may identify the same or similar elements.

A variety of encryption and decryption techniques are used to secure private information over computer networks, such as a data encryption standard (DES) technique, a triple-DES technique, an advanced encryption standard (AES) technique, and/or the like.

The DES technique uses a cipher key for carrying out block encryption. Each data block of plain text has a length of sixty-four bits, and a corresponding cipher text (e.g., encrypted text) block also has the same bit length. The DES technique utilizes a small number of bits in the cipher key to encrypt the data blocks. However, the DES technique fails to provide a high security data encryption scheme, and cipher text blocks, which are encrypted with the cipher key, are relatively easy to decrypt.

The triple DES technique is based on the DES technique, but utilizes a longer cipher key and executes the encryption routine three times. However, with the advancement in technology, even the triple DES is becoming simple enough to decrypt.

The AES technique offers a larger key size, and a number of rounds performed during the execution of the AES technique depends on the key size. Even though the AES technique provides better security than the DES technique and the triple DES technique, the AES technique is still limited. For example, the AES technique specifies and uses identical parameters for various rounds of encryption, which make the AES technique susceptible to compromise especially with the advancement in technology.

Some implementations described herein may provide an encryption platform that provides a custom encryption function for communications between a client device and a server device. For example, the encryption platform may receive credentials of a user of a client device that is accessing an application associated with a server device, and may verify the user based on the credentials of the user. The encryption platform may retrieve a random function from a random functions data structure based on verifying the user, and may utilize the random function to randomly (or pseudo-randomly) select parameters and values for a user function. The encryption platform may utilize the user function, the parameters, and the values to generate a custom encryption function, and may encrypt the custom encryption function. The encryption platform may provide the encrypted custom encryption function to the client device and the server device to permit encrypted communications between the client device and the server device using the custom encryption function.

Figure 1A:
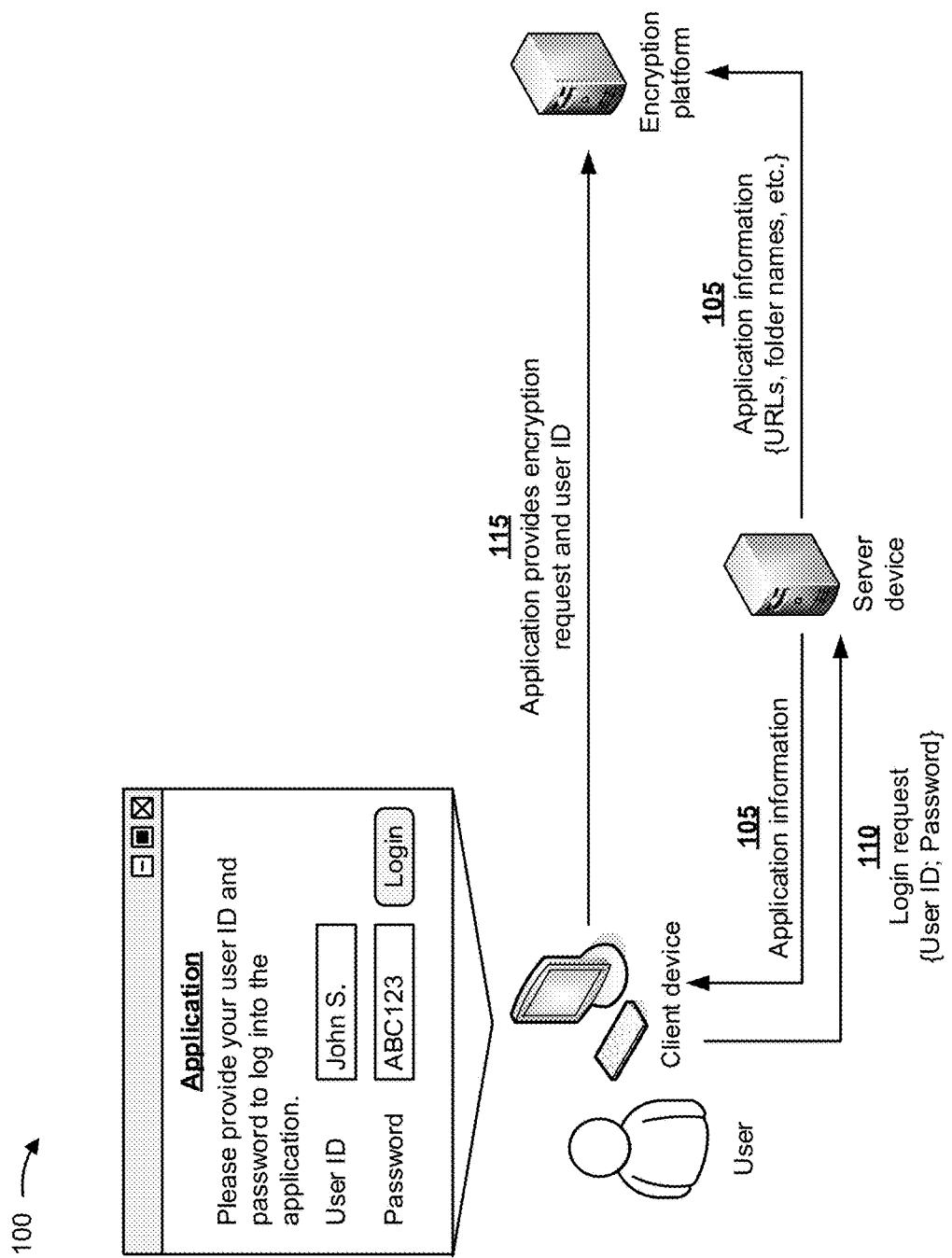
FIGS. 1A-1G are diagrams of an overview of an example implementation described herein.

FIGS. 1A-1G are diagrams of an overview of an example implementation 100 described herein. As shown in FIG. 1A, a user may be associated with a client device, a server device, and an encryption platform. Assume that the user wishes to utilize the client device to access an application provided by the server device. In some implementations, the application may include an application that requires secure communications between the client device and the server device. For example, the application may require communications, between the client device and the server device, which include private information (e.g., financial information, personal information, and/or the like) associated with the user.

As further shown in FIG. 1A, and by reference number 105, the server device may provide application information to the client device and the encryption platform. In some implementations, the application information may include information associated with the application, such as information indicating locations of the application at the server device (e.g., uniform resource locators (URLs)), information indicating folders storing information associated with the application at the server device, information indicating files associated with the application, credentials (e.g., user identifiers, user names, user passwords, Internet protocol (IP) addresses, and/or the like) associated with verified users of the application (e.g., although only the encryption platform may receive the credentials), and/or the like.

As further shown in FIG. 1A, and by reference number 105, the client device may receive the application information, and may provide, for display to the user, a user interface that requests credentials (e.g., a user identifier (ID), a password, a secret, biometric indicia, and/or the like) of the user for accessing the application. For example, the user interface may request that the user provide a user ID and a password for logging into the application. The user may provide a user ID (e.g., John S.) and a password (e.g., ABC123) for the credentials. As further shown in FIG. 1A, and by reference number 110, the user may cause the client device to provide, to the server device, the credentials and a login request to log into the application. The server device may receive the credentials and the login request, and may utilize the credentials (e.g., the user ID and the password, etc.) in order to determine whether the user is authorized to access the application.

As further shown in FIG. 1A, and by reference number 115, once the user causes the client device to provide the credentials and the login request to the server device, the application may cause the client device to provide an encryption request and the credentials (e.g., the user ID) to the encryption platform. The encryption platform may receive the encryption request and the credentials. In some implementations, the encryption request may include information requesting that communications, between the client device and the server device and relating to the application, be encrypted.

Figure 1B:
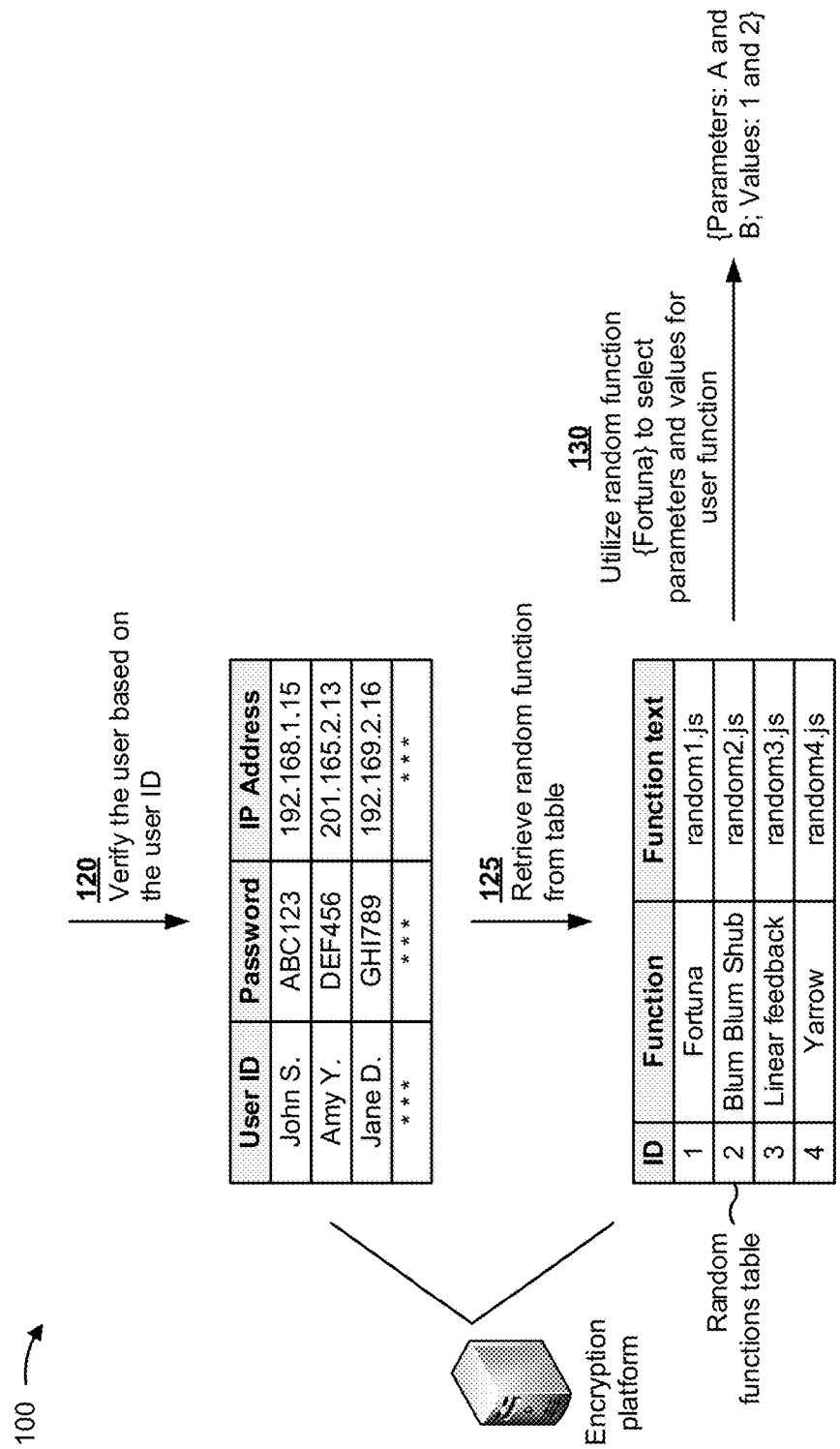

As shown in FIG. 1B, and by reference number 120, the encryption platform may verify the user based on the credentials (e.g., the user ID) provided by the client device. In some implementations, the encryption platform may be associated with a data structure (e.g., a table, a database, a linked list, a tree, and/or the like) that includes credentials of users that are authorized to utilize the application provided by the server device. In such implementations, the data structure may include information associated with user IDs, user names, passwords, IP addresses, and/or the like, of users that are authorized to utilize the application provided by the server device. In such implementations, the encryption platform may compare the credentials (e.g., the user ID) provided by the client device with the information stored in the data structure, and may verify the credentials based on the comparison. For example, the encryption platform may compare the user ID (e.g., John S.) with the information stored in the data structure, and may verify the user ID since the user ID matches a user ID provided in the data structure.

As further shown in FIG. 1B, and by reference number 125, the encryption platform may retrieve a random function, from a random functions table, based on verifying the user. In some implementations, the encryption platform may be associated with a data structure (e.g., the random functions table) that includes random functions (e.g., pseudorandom number generation functions), such as a Fortuna function, a Blum Blum Shub function, a linear feedback function, a Yarrow function, and/or the like, an identifier (ID) for each random function, text for each random function, and/or the like. In such implementations, the encryption platform may randomly select one of the random functions from the random functions table, and may retrieve the text associated with the selected random function. The term random, as used herein, is to be broadly construed to include pseudorandom, random like, non-deterministic, and/or the like.

As further shown in FIG. 1B, and by reference number 130, the encryption platform may utilize the selected random function (e.g., the Fortuna function) to select parameters (e.g., A and B) and values (e.g., 1 and 2) for a user function. In some implementations, the user function may include the credentials of the user (e.g., the user ID) and a function that utilizes the parameters and the values to generate a custom encryption function for communications associated with the application and provided between the client device and the server device. In some implementations, the user function may utilize a variety of operations to generate encryption steps for the custom encryption function, such as a substitution operation, a shifting operation, an exclusive or (XOR) addition operation, a reverse operation, an isolate operation, a split operation, and/or the like.

In some implementations, the parameters may include a parameter identifying a block size for encryption, a parameter identifying a key size for an encryption step, a parameter identifying a sequence size for an encryption step, a parameter identifying a random function for an encryption step, a parameter identifying an encryption function for an encryption step, a parameter identifying a number of rounds of encryption, and/or the like.

In some implementations, the values may include randomly/pseudo-randomly generated numbers that are utilized to determine identification numbers associated with different encryption functions and/or different ciphers. In some implementations, the different encryption functions may include a Rivest-Shamir-Adleman (RSA) encryption function, a Diffie-Hellman encryption function, a digital signature algorithm (DSA) encryption function, an ElGamal encryption function, an elliptic-curve cryptography (ECC) encryption function, an elliptic curve digital signature algorithm (ECDSA) encryption function, an efficient and compact subgroup trace representation (XTR) encryption function, and/or the like. In some implementations, the different ciphers may include an advanced encryption standard (AES) cipher, a data encryption standard (DES) cipher, a triple DES cipher, a blowfish cipher, a twofish cipher, a threefish cipher, an international data encryption algorithm (IDEA) cipher, a Rivest cipher 4 (RC4) cipher, a tiny encryption algorithm (TEA) cipher, and/or the like.

Figure 1C:
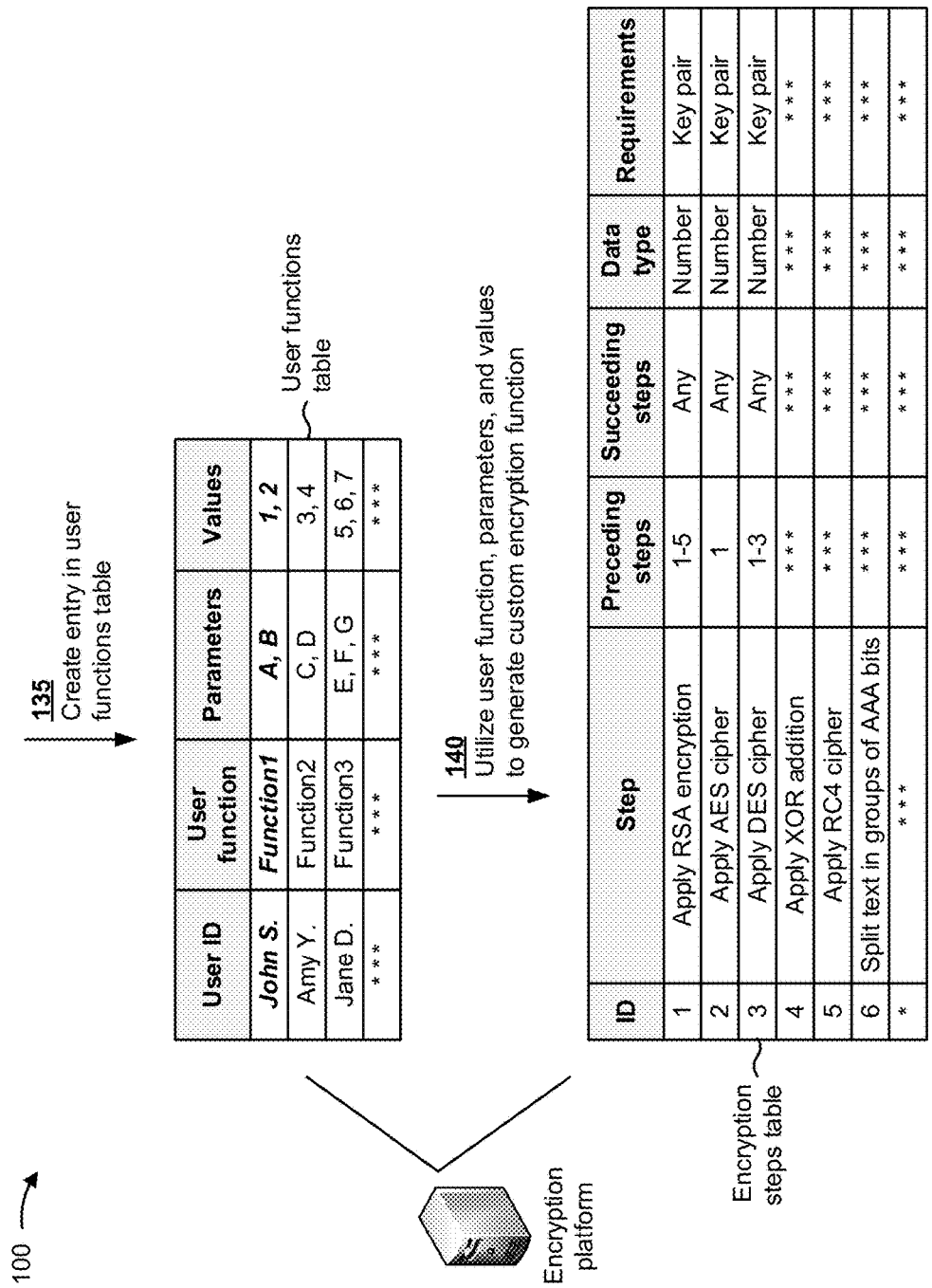

As shown in FIG. 1C, and by reference number 135, the encryption platform may create an entry in a user functions table associated with the encryption platform. In some implementations, the user functions table may include information identifying users of the application (e.g., user IDs), information identifying user functions associated with each of the users, information identifying the parameters and the values for each of the user functions, and/or the like. In some implementations, the encryption platform may create a new entry in the user functions table each time a user (e.g., via a client device) communicates with the application provided by the server device. For example, as shown in FIG. 1C, the encryption platform may create an entry for the user (e.g., John S.), the user function for the user (e.g., Function1), the parameters associated with the user function (e.g., A and B), and the values associated with the user function (e.g., 1 and 2).

As further shown in FIG. 1C, and by reference number 140, the encryption platform may utilize the user function, the parameters, and the values to generate a custom encryption function for communications associated with the application and provided between the client device and the server device. In some implementations, the custom encryption function may include encryption steps provided in an encryption steps table. In some implementations, the user function may utilize the variety of operations (e.g., provided by the user function), the parameters, and the values to cause the encryption platform to generate the encryption steps for the custom encryption function.

As further shown in FIG. 1C, the encryption steps table (e.g., the custom encryption function) may include information indicating identifiers (IDs) for the encryption steps, information indicating the encryption steps (e.g., apply RSA encryption, apply AES cipher, apply DES cipher, apply XOR addition, apply RC4 cipher, split text into groups of AAA bits, and/or the like), information indicating preceding encryption steps (e.g., restrictions on which preceding encryption steps can be done in which order), information indicating succeeding encryption steps (e.g., restrictions on which succeeding encryption steps can be done in which order), information indicating data types for the encryption steps (e.g., data types that may be used as replacing variable values in each encryption step), information indicating requirements for the encryption steps (e.g., requirements for executing an encryption step, such as a public key and a private key pair, which may be included in the custom encryption function if asymmetric encryption is randomly selected as an encryption step), and/or the like.

Figure 1D:
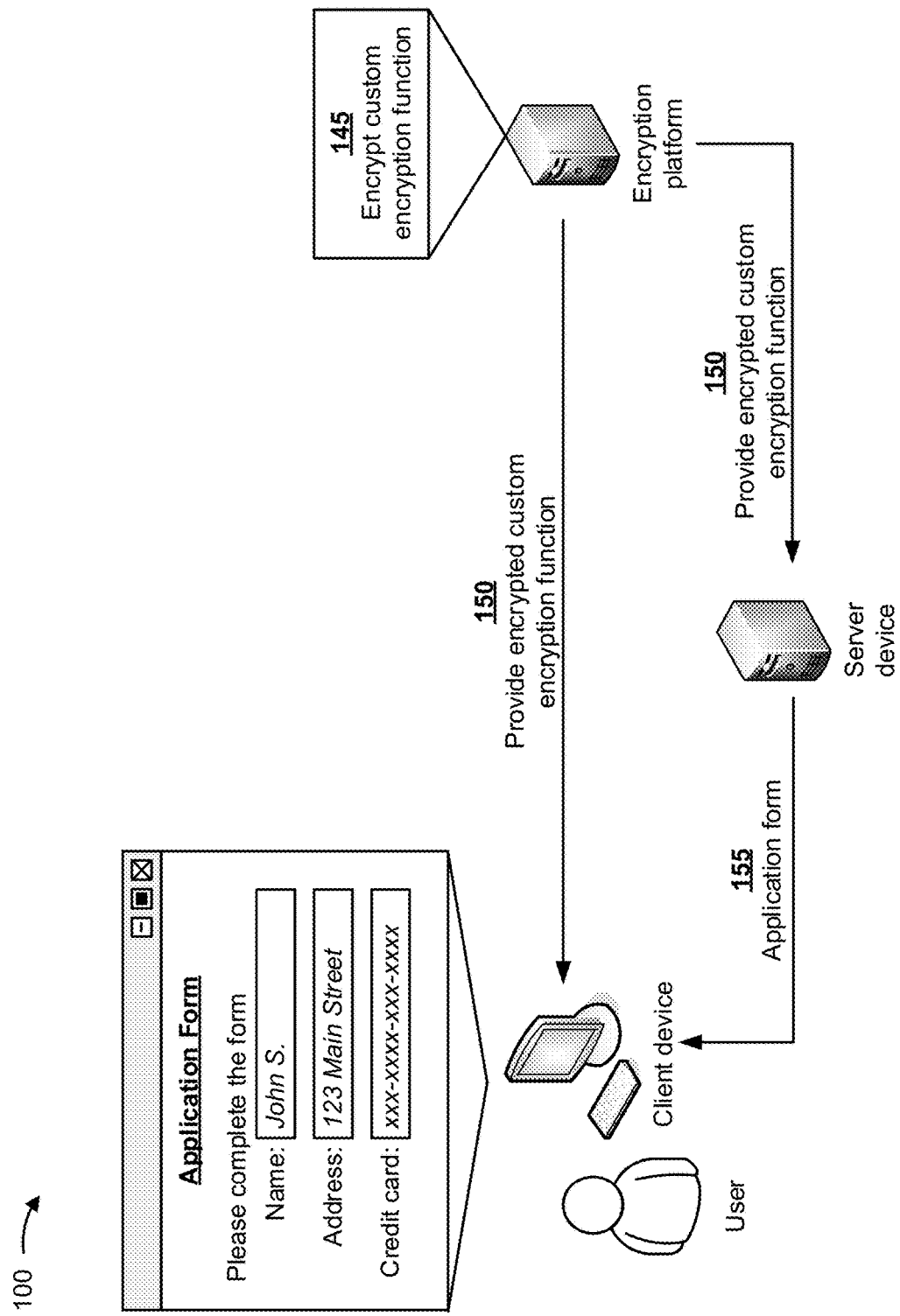

As shown in FIG. 1D, and by reference number 145, the encryption platform may encrypt the custom encryption function to generate an encrypted custom encryption function. In some implementations, the encryption platform may utilize one or more of the different encryption functions (e.g., the RSA encryption function, the Diffie-Hellman encryption function, the DSA encryption function, the ElGamal encryption function, the ECC encryption function, the ECDSA encryption function, the XTR encryption function, and/or the like) and/or one or more of the different ciphers (e.g., the AES cipher, the DES cipher, the triple DES cipher, the blowfish cipher, the twofish cipher, the threefish cipher, the IDEA cipher, the RC4 cipher, the TEA cipher, and/or the like) to encrypt the custom encryption function.

As further shown in FIG. 1D, and by reference number 150, the encryption platform may provide the encrypted custom encryption function to the client device and the server device, and the client device and the server device may receive the encrypted custom encryption function. As further shown in FIG. 1D, and by reference number 155, assume that the application (e.g., via the server device) provides an application form to the client device. The client device may receive the application form, and may provide information associated with the application form for display to the user via a user interface. In some implementations, the information associated with the application form may request private information associated with the user, such as a name of the user, an address of the user, a credit card number of the user, and/or the like.

Figure 1E:
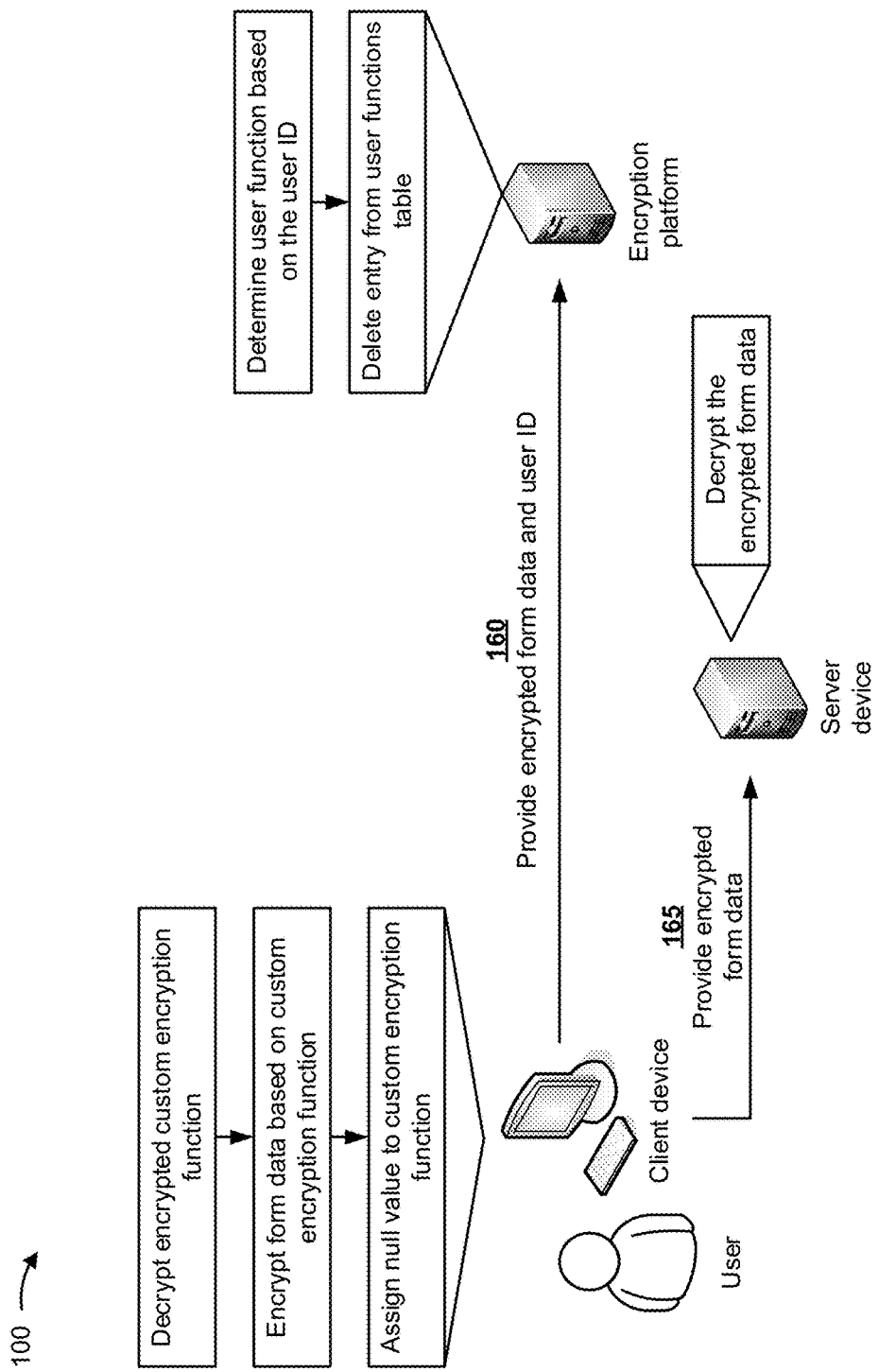

As shown in FIG. 1E, in order to protect the private information, the client device may decrypt the encrypted custom encryption function to generate the custom encryption function, and may encrypt form data (e.g., the private information requested by the information associated with the application form) based on the custom encryption function. After encrypting the form data based on the custom encryption function, the client device may assign a null value to the custom encryption function so that the custom encryption function cannot be utilized again by the client device.

As further shown in FIG. 1E, and by reference number 160, the client device may provide the encrypted form data and the credentials of the user (e.g., the user ID) to the encryption platform, and the encryption platform may receive the encrypted form data and the credentials of the user. Based on receiving the encrypted form data and the credentials of the user, the encryption platform may determine the user function based on the credentials of the user (e.g., the user ID), and may delete an entry from the user functions table associated with the credentials of the user so that the encryption platform may store another new entry for the user in the user functions table (e.g., if the user utilizes the client device to further interact with the application provided by the server device). For example, with reference to FIG. 1C, the encryption platform may determine that the user function (e.g., Function1) is associated with the user ID (e.g., John S.), and may delete the entry associated with the user function and the user ID from the user functions table.

As further shown in FIG. 1E, and by reference number 165, the client device may provide the encrypted form data to the server device, and the server device may receive the encrypted form data. In some implementations, the server device may decrypt the encrypted custom encryption function (e.g., previously provided by the encryption platform) to generate the custom encryption function, and may utilize the custom encryption function in reverse order (e.g., reverse the encryption steps of the custom encryption function) to decrypt the encrypted form data. In some implementations, the application provided by the server device may utilize the form data to perform a function associated with the application.

Figure 1F:
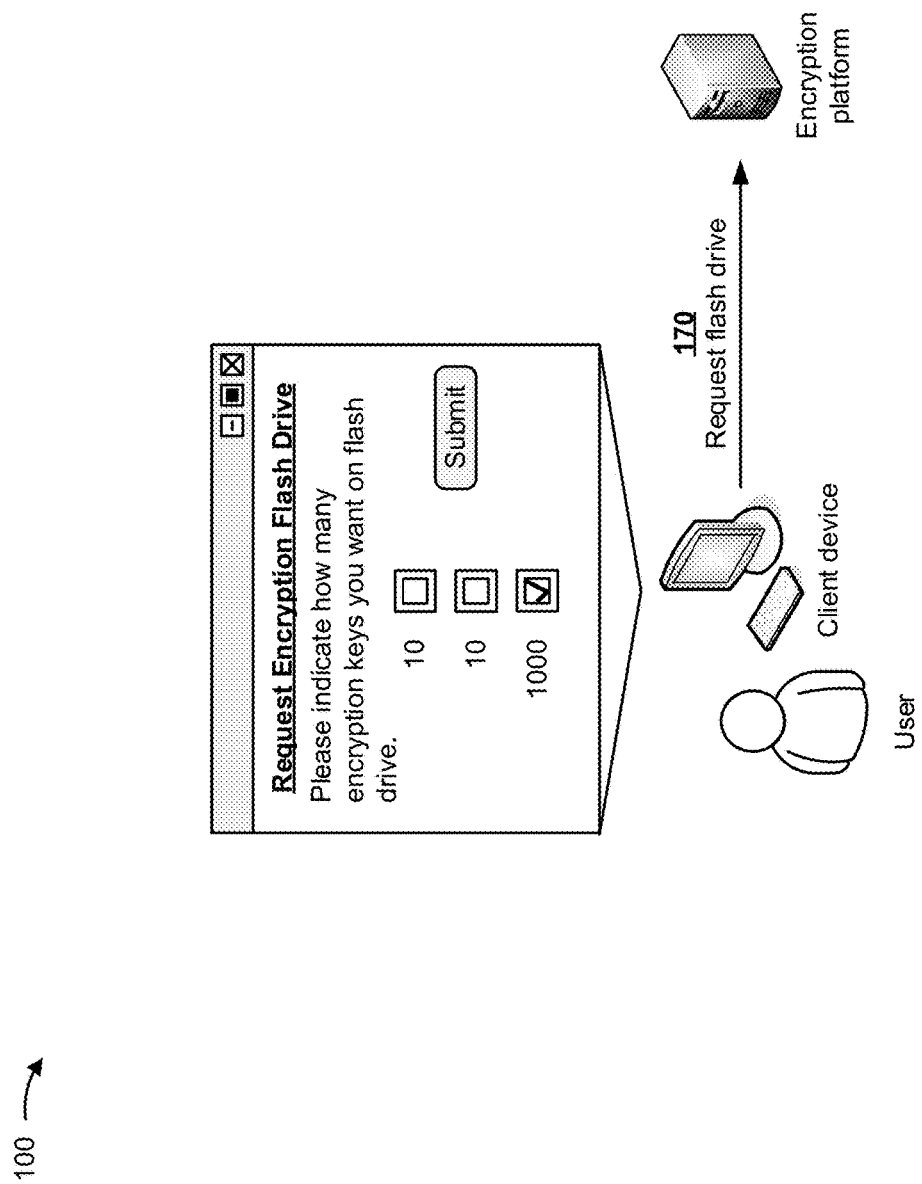

As shown in FIG. 1F, now assume that the user utilizes the client device to access an application provided by the encryption platform. Further assume that the application enables the user to request a portable memory device (e.g., a flash drive) with one or more encryption keys (e.g., custom encryption functions). As further shown, the application may provide a user interface to the client device, and the client device may display the user interface. The user interface may request the user to indicate how many encryption keys are to be provided on the flash drive. The user may utilize the client device to indicate the number (e.g., 1000) of encryption keys to provide on the flash drive. As further shown in FIG. 1F, and by reference number 170, the user may cause the client device to provide, to the encryption platform, a request for the flash drive with the indicated number of encryption keys.

In some implementations, the user may receive the flash drive (e.g., via mail) from an entity associated with the encryption platform based on the request for the flash drive. In some implementations, the user may request the flash drive from the server device, and may receive the flash drive from an entity associated with the server device.

Figure 1G:
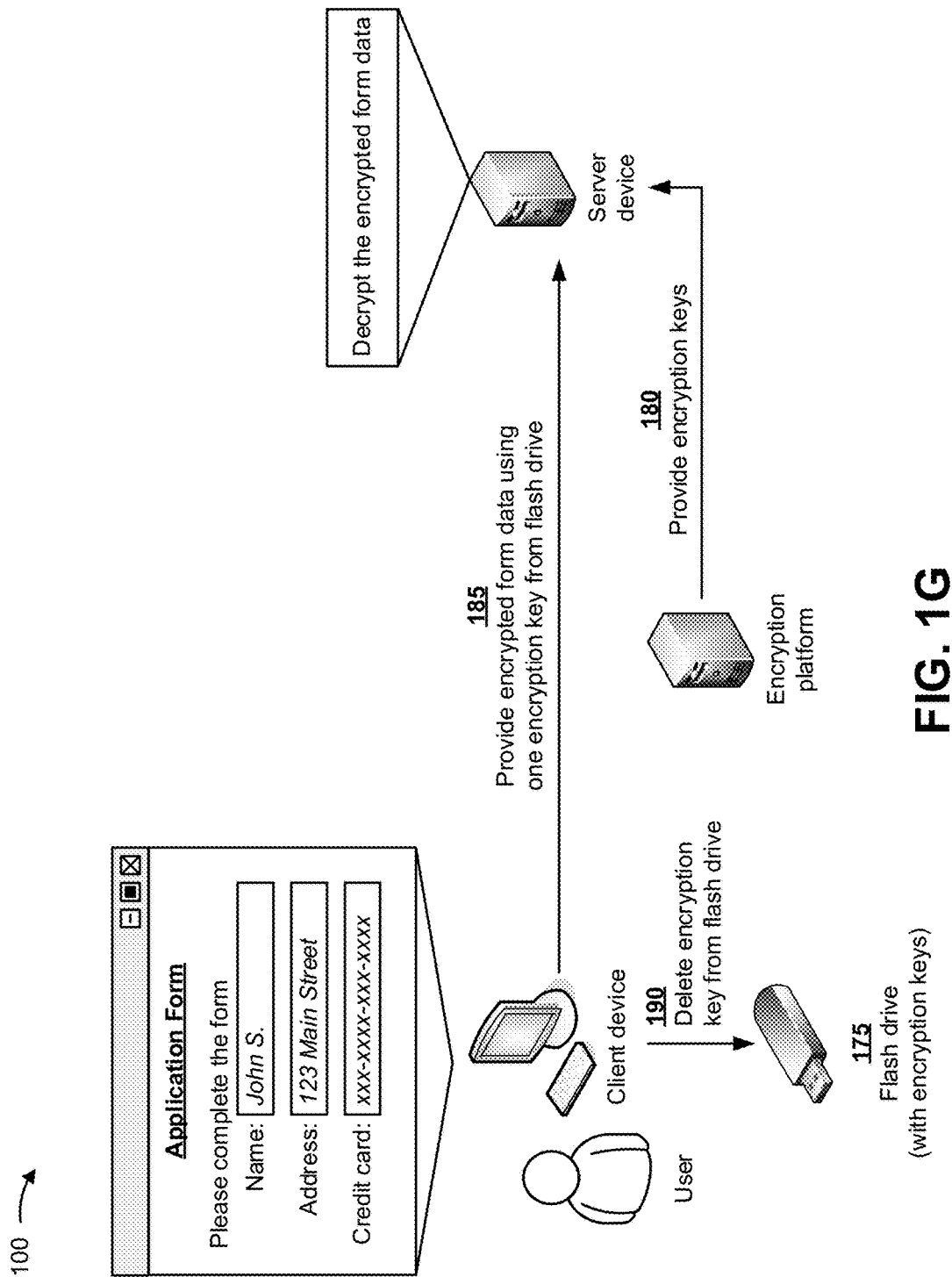

As shown in FIG. 1G, and by reference number 175, the user may receive the flash drive with the encryption keys, and may connect the flash drive to the client device. As further shown in FIG. 1G, and by reference number 180, the encryption platform may provide the encryption keys (e.g., stored on the flash drive) to the server device (e.g., in a secure manner). Assume that the application (e.g., via the server device) provides an application form to the client device. The client device may receive the application form, and may provide information associated with the application form for display to the user via a user interface. In some implementations, the information associated with the application form may request private information associated with the user, such as a name of the user, an address of the user, a credit card number of the user, and/or the like.

In order to protect the private information, the client device may utilize one encryption key from the flash drive to encrypt form data (e.g., the private information requested by the information associated with the application form). As further shown in FIG. 1G, and by reference number 185, the client device may provide the encrypted form data to the server device, and the server device may receive the encrypted form data. In some implementations, the server device may utilize a corresponding encryption key (e.g., provided by the encryption platform to the server device) to decrypt the encrypted form data. In some implementations, the application provided by the server device may utilize the form data to perform a function associated with the application. As further shown in FIG. 1G, and by reference number 190, after encrypting the form data with the one encryption key of the flash drive, the client device may delete the one encryption key from the flash drive so that the one encryption key cannot be utilized again by the client device.

In this way, the encryption platform may enable secure communications between the client device and the server device, which may improve speed and efficiency of the communications and conserve computing resources (e.g., processors, memory, and/or the like). Furthermore, implementations described herein use a computerized process to perform tasks or roles that were not previously performed or were previously performed using subjective human intuition or input. For example, prior solutions are unable to provide custom encryption functions for each application session between the client device and the server device. Finally, enabling secure communications between the client device and the server device conserves computing resources (e.g., processors, memory, and/or the like) that would otherwise be wasted in unsuccessfully attempting to provide secure communications, police communications, and locate cybercriminals.

As indicated above, FIGS. 1A-1G are provided merely as examples. Other examples are possible and may differ from what was described with regard to FIGS. 1A-1G.

Figure 2:
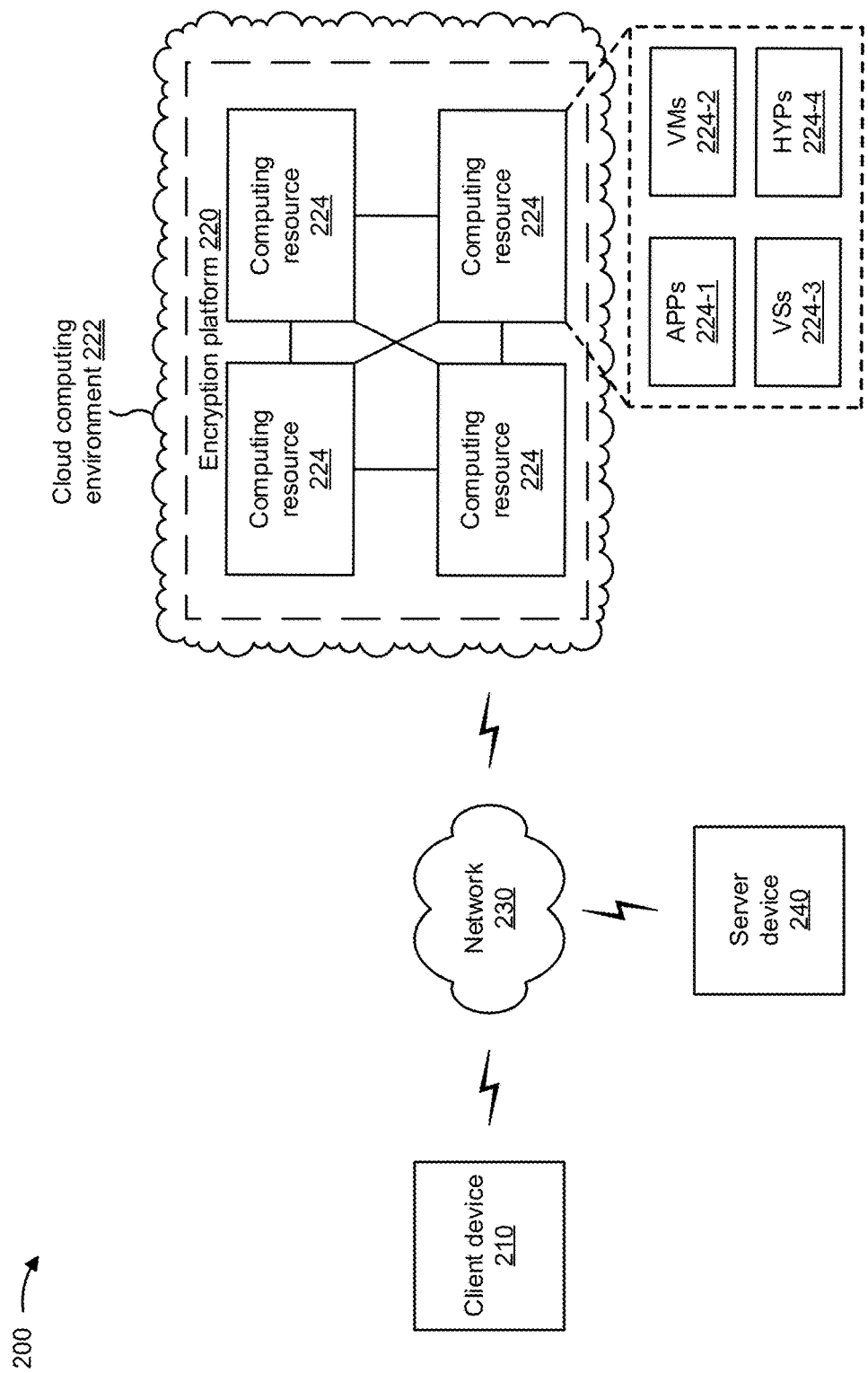
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, an encryption platform 220, a network 230, and a server device 240. Devices of environment 200 may interconnect via wired connections, wireless connections, or a combination of wired and wireless connections.

Client device 210 includes one or more devices capable of receiving, generating, storing, processing, and/or providing information, such as information described herein. For example, client device 210 may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, client device 210 may receive information from and/or transmit information to encryption platform 220 and/or server device 240.

Encryption platform 220 includes one or more devices that provide a custom encryption function for communications between client device 210 and server device 240. In some implementations, encryption platform 220 may be designed to be modular such that certain software components may be swapped in or out depending on a particular need. As such, encryption platform 220 may be easily and/or quickly reconfigured for different uses. In some implementations, encryption platform 220 may receive information from and/or transmit information to one or more client devices 210 and/or server devices 240.

In some implementations, as shown, encryption platform 220 may be hosted in a cloud computing environment 222. Notably, while implementations described herein describe encryption platform 220 as being hosted in cloud computing environment 222, in some implementations, encryption platform 220 may not be cloud-based (i.e., may be implemented outside of a cloud computing environment) or may be partially cloud-based.

Cloud computing environment 222 includes an environment that hosts encryption platform 220. Cloud computing environment 222 may provide computation, software, data access, storage, etc. services that do not require end-user knowledge of a physical location and configuration of system(s) and/or device(s) that hosts encryption platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host encryption platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by client device 210 and/or server device 240. Application 224-1 may eliminate a need to install and execute the software applications on client device 210 and/or server device 240. For example, application 224-1 may include software associated with encryption platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., a user of client device 210 and/or server device 240, or an operator of encryption platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

Server device 240 includes one or more devices capable of receiving, generating, storing, processing, and/or providing information, such as information described herein. For example, server device 240 may include a laptop computer, a tablet computer, a desktop computer, a server device, a group of server devices, or a similar type of device, that provides a social media application for access by client device 210. In some implementations, server device may receive information from and/or transmit information to client device 210 and/or encryption platform 220.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
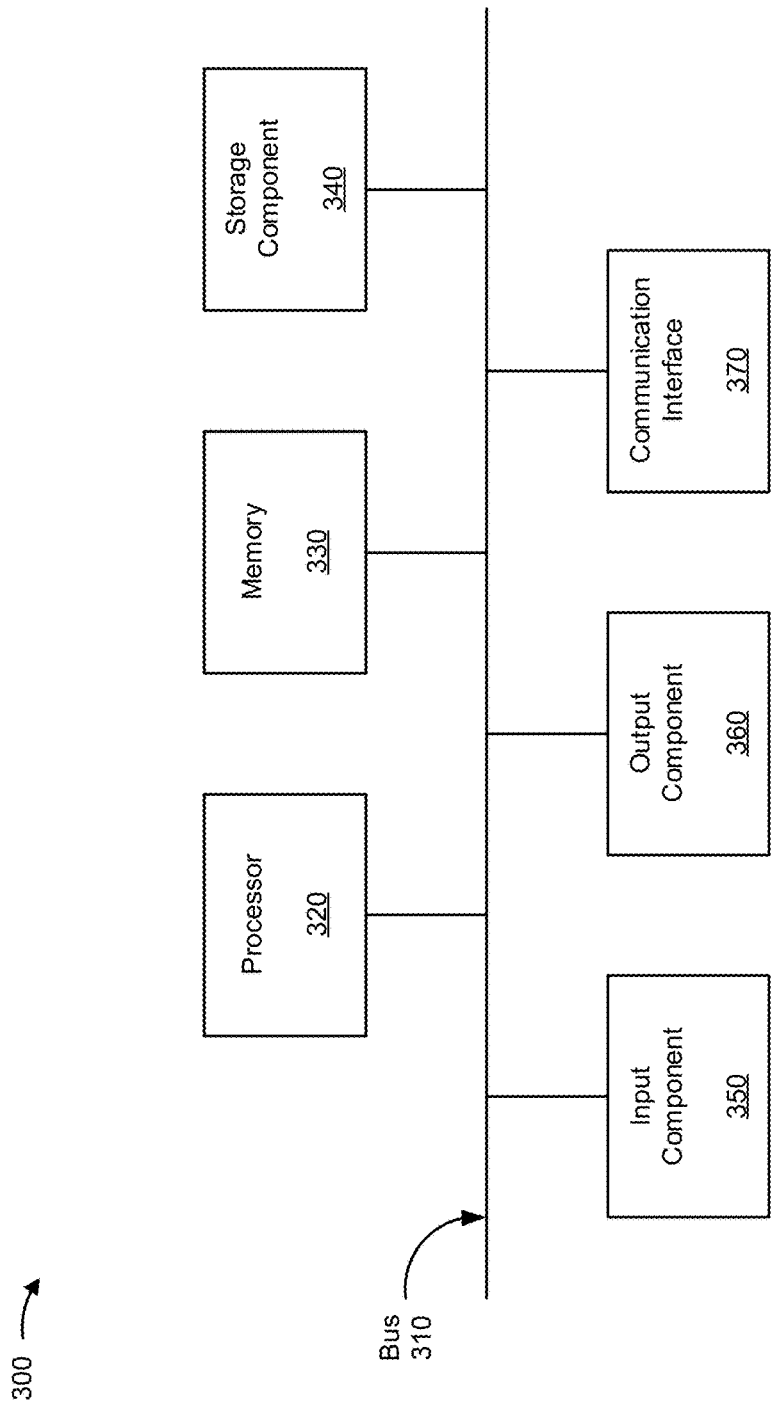
FIG. 3 is a diagram of example components of one or more devices of FIG. 2.

FIG. 3 is a diagram of example components of a device 300. Device 300 may correspond to client device 210, encryption platform 220, computing resource 224, and/or server device 240. In some implementations, client device 210, encryption platform 220, computing resource 224, and/or server device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for providing a custom encryption function for communications between a client device and a server device. In some implementations, one or more process blocks of FIG. 4 may be performed by encryption platform 220. In some implementations, one or more process blocks of FIG. 4 may be performed by another device or a group of devices separate from or including encryption platform 220, such as client device 210 and/or server device 240.

As shown in FIG. 4, process 400 may include receiving credentials of a user of a client device that is accessing an application associated with a server device (block 410). For example, encryption platform 220 may receive credentials of a user of client device 210 that is accessing an application associated with server device 240. In some implementations, the user, associated with client device 210, may utilize client device 210 to access the application provided by server device 240. In some implementations, the application may include an application that requires secure communications between client device 210 and server device 240 since the communications may include private information (e.g., financial information, demographic information, personal information, and/or the like) associated with the user.

Client device 210 may receive application information associated with the application, and may provide, for display to the user, a user interface that requests credentials (e.g., a user identifier (ID), a password, a voice input, a smart card, a security token, a fingerprint impression, a retinal scan, and/or the like) of the user for accessing the application.

The user may provide the credentials via client device 210, and may cause client device 210 to provide, to server device 240, the credentials and a login request to log into the application. Server device 240 may receive the credentials and the login request, and may utilize the credentials in order to determine whether the user is authorized to access the application.

Once the user causes client device 210 to provide the credentials and the login request to server device 240, the application may cause client device 210 to provide an encryption request and the credentials (e.g., the user ID) to encryption platform 220. Encryption platform 220 may receive the encryption request and the credentials. In some implementations, the encryption request may include information requesting that communications, between client device 210 and server device 240 and relating to the application, be encrypted.

In this way, encryption platform 220 may receive the credentials of the user of client device 210 that is accessing the application associated with server device 240.

As further shown in FIG. 4, process 400 may include verifying the user based on the credentials of the user (block 420). For example, encryption platform 220 may verify the user based on the credentials of the user. In some implementations, encryption platform 220 may be associated with a data structure that includes credentials of users that are authorized to utilize the application provided by server device 240. In such implementations, the data structure may include information associated with credentials (e.g., user IDs, user names, passwords, IP addresses, and/or the like) of users that are authorized to utilize the application provided by server device 240. In such implementations, encryption platform 220 may compare the credentials provided by client device 210 with the information stored in the data structure, and may verify the credentials based on the comparison.

In some implementations, encryption platform 220 may receive other information, with the encryption request, that may be utilized to verify the user. For example, encryption platform 220 may receive the password entered by the user, and may verify the user based on the password. In another example, encryption platform 220 may receive the IP address of client device 210, and may verify the user based on the IP address of client device 210. As another example, encryption platform 220 may receive information associated with an additional form of authentication such as a biometric input by the user (e.g., a fingerprint, a retinal scan, a voice input, etc.), a security token, a smart card, and/or the like, and may verify the user based on the additional form of authentication. In some implementations, encryption platform 220 may initially receive a first form of authentication, as described above (e.g., a password), and may automatically request a second form of authentication (e.g., a fingerprint) and obtain the second form of authentication (e.g., from client device 210) to verify the user. In some implementations, encryption platform 220 may seek additional forms of authentication in a similar fashion.

In this way, encryption platform 220 may verify the user based on the credentials of the user.

As further shown in FIG. 4, process 400 may include receiving a random function from a random functions data structure based on verifying the user (block 430). For example, encryption platform 220 may receive a random function from a random functions data structure based on verifying the user. In some implementations, a random functions table may be associated with encryption platform 220 and may include random functions (e.g., pseudo-random number generation functions), such as a Fortuna function, a Blum Blum Shub function, a linear feedback function, a Yarrow function, and/or the like, an ID for each random function, text for each random function, and/or the like.

In some implementations, a pseudo-random number generation function, which may also be known as a deterministic random bit generator, may include an algorithm for generating a sequence of numbers whose properties approximate the properties of sequences of random numbers, even though the sequence is not purely random because it is determined by an initial (e.g., seed) value.

The Fortuna function may include a family of secure (e.g., cryptographically secure) pseudo-random number generation functions that include a generator that produces an indefinite quantity of pseudo-random data, an entropy accumulator that collects genuinely random data from various sources and uses it to reseed the generator, and a seed file that stores enough state to enable encryption platform 220 to start generating random numbers.

The Blum Blum Shub function may include a pseudo-random number generation function that takes the form $x_{n+1}=(x_n)^2$ mod M, where M is the product of two large prime numbers p and q, where at each step of the algorithm, some output is derived from $x_{n+1}$, and where the seed $x_0$ is an integer that is co-prime to M and not 1 or 0.

The linear feedback function may include a linear feedback shift register function, such as a function that may be implemented by a linear feedback shift register (e.g., a shift register whose input bit is a linear function of its previous state).

The Yarrow function may include a pseudo-random number generation function that includes a Yarrow algorithm that uses a hash function (e.g., a secure hash algorithm 1 (SHA-1) hash function) and a block cipher (e.g., a three-key, triple DES cipher), and includes an entropy accumulator, a reseed mechanism, a generation mechanism, and a reseed control.

In some implementations, encryption platform 220 may randomly select one of the random functions from the random functions table, and may retrieve the text associated with the selected random function. In such implementations, encryption platform 220 may utilize a random selection technique to select one of the random functions from the random function table. For example, encryption platform 220 may utilize simple random selection technique in which each of the random functions has an equal probability of being selected by encryption platform 220.

In this way, encryption platform 220 may receive the random function from the random functions data structure based on verifying the user.

As further shown in FIG. 4, process 400 may include utilizing the random function to select parameters and values for a user function (block 440). For example, encryption platform 220 may utilize the random function to select parameters and values for a user function. In some implementations, the user function may include the credentials (e.g., the user ID) and a function that utilizes the parameters and the values to generate a custom encryption function for communications associated with the application and provided between the client device and the server device. In some implementations, the user function may utilize a variety of operations to generate steps for the custom encryption function, such as a substitution operation, a shifting operation, an XOR addition operation, a reverse operation, an isolate operation, a split operation, and/or the like.

The substitution operation may include an operation with a substitution cipher, in which units of plain text are replaced with cipher text according to a fixed system, and where a receiver deciphers the text by performing an inverse substitution. The shifting operation may include an operation with a shift cipher (also known as a Caesar cipher), which is a type of substitution cipher in which each letter in plain text (e.g., C) is replaced by a letter that is a fixed number of positions down the alphabet (e.g., J replaces C since J is 7 positions down from C). The XOR addition operation may include an operation with an XOR cipher, which is a type of additive cipher based on an exclusive OR function, and implements an encryption algorithm that operates according to the principles: A (XOR) 0=A, A (XOR) A=0, (A (XOR) B) (XOR) C=A, and (B (XOR) A) (XOR) A=B (XOR) 0=B.

The reverse operation may include an operation with a reverse encryption function (e.g., a reverse encryption algorithm), which is a symmetric stream cipher that uses a variable-length key, and performs encryption by adding the keys to the text, converting the text to American Standard Code for Information Interchange (ASCII) code, converting the ASCII code to binary data, reversing the binary data, gathering portions (e.g., a number of bits) from the binary data and obtaining the ASCII code, dividing the ASCII code (e.g., by a number), obtaining the ASCII code of the division result and assigning it as a first character, and obtaining the division remainder and assigning it as a second character.

The isolate operation may include a virtual isolation operation in which virtualization is applied to isolate functionality, such as by executing code of a web page in a disposable virtual container that is automatically discarded at the end of a web session. The split operation may include a cryptographic splitting operation (also known as cryptographic bit splitting or cryptographic data splitting), which is a technique that involves encrypting data, splitting the encrypted data into smaller data units, distributing the smaller units to different storage locations, and then further encrypting the data at the different storage locations, such that even if an intruder is able to retrieve and decrypt one data unit, the information would be useless unless it can be combined with decrypted data units from the other locations.

In some implementations, the parameters may include a parameter identifying a block size for encryption, a parameter identifying a key size for an encryption step, a parameter identifying a sequence size for an encryption step, a parameter identifying a random function for an encryption step, a parameter identifying an encryption function for an encryption step, a parameter identifying a number of rounds of encryption, and/or the like.

In some implementations, the values may include randomly generated numbers that are utilized to determine identification numbers associated with different encryption functions and/or different ciphers. In some implementations, the different encryption functions may include a RSA encryption function, a Diffie-Hellman encryption function, a DSA encryption function, an ElGamal encryption function, an ECC encryption function, an ECDSA encryption function, an XTR encryption function, and/or the like.

The RSA encryption function may include a type of public-key cryptosystem which uses a public encryption key (based on two large prime numbers) that can be used by anyone to encrypt the data, and uses a private decryption key that is kept secret such that only someone who has the private key can decrypt the data. The Diffie-Hellman encryption function may include a method of securely exchanging cryptographic keys in which two parties, which have no prior knowledge of each other, can jointly establish a shared secret key over an insecure channel, and the key can then be used to encrypt subsequent communications using a symmetric key cipher.

The DSA encryption function may include mathematical functions that create a digital signature, which may include two numbers of a particular bit length and are originated from message digests and a private key, and a public key may be used for authenticating the signature. The ElGamal encryption function may include an asymmetric key encryption algorithm for public-key cryptography which is based on the Diffie-Hellman key exchange, and may provide an additional layer of security by asymmetrically encrypting keys previously used for symmetric message encryption.

The ECC encryption function may include a form of public-key cryptography based on the algebraic structure of elliptic curves over finite fields, and may require smaller keys compared to non-ECC cryptography (based on plain Galois fields) to provide equivalent security. The ECDSA encryption function may include an algorithm that is a variant of the DSA encryption function and that uses elliptic curve cryptography. The XTR encryption function may include an algorithm for public-key encryption that represents elements of a subgroup of a multiplicative group of a finite field.

In some implementations, the different ciphers may include an AES cipher, a DES cipher, a triple DES cipher, a blowfish cipher, a twofish cipher, a threefish cipher, an IDEA cipher, a RC4 cipher, a TEA cipher, and/or the like.

The AES cipher may include an algorithm that utilizes a combination of both substitution and permutation, and utilizes three block ciphers which encrypt and decrypt data in blocks of 128 bits using cryptographic keys of 128 bits, 192 bits, and 256 bits, respectively. The DES cipher may include a symmetric key block cipher in which text is grouped into 64-bit blocks, and each block is encrypted, using the symmetric key, into a 64-bit cipher text by means of permutation and substitution. The triple DES cipher may include a symmetric-key block cipher that applies the DES cipher algorithm three times to each data block, using three 56-bit keys.

The blowfish cipher may include a symmetric-key block cipher that uses a 64-bit block size and a variable key length from 32 bits up to 448 bits. The twofish cipher may include a symmetric key block cipher with a block size of 128 bits and key sizes up to 256 bits. The threefish cipher may include a symmetric-key block cipher that is tweakable (e.g., a block cipher that accepts a second input (called a tweak) along with the plain text or cipher text input which, along with the key, selects the permutation computed by the cipher), and is part of a Skein hash function. The IDEA cipher may include a symmetric-key block cipher that operates on 64-bit blocks using a 128-bit key, and applies a series of identical transformations (called a round) and applies an output transformation (called a half-round). The RC4 cipher may include a stream cipher that generates a pseudorandom stream of bits (e.g., a keystream) that can be used for encryption by combining it with the plain text using a bit-wise exclusive-OR function. The TEA cipher may include a block cipher that operates on two 32-bit unsigned integers (e.g., derived from a 64-bit data block) and uses a 128-bit key.

In this way, encryption platform 220 may utilize the random function to select the parameters and the values for the user function.

As further shown in FIG. 4, process 400 may include utilizing the user function, the parameters, and the values to generate a custom encryption function (block 450). For example, encryption platform 220 may utilize the user function, the parameters, and the values to generate a custom encryption function. In some implementations, encryption platform 220 may utilize the user function, the parameters, and the values to generate a custom encryption function for communications associated with the application and provided between client device 210 and server device 240. In some implementations, the custom encryption function may include a variety of encryption steps selected from the different encryption functions (e.g., the RSA encryption function, the Diffie-Hellman encryption function, the DSA encryption function, the ElGamal encryption function, the ECC encryption function, the ECDSA encryption function, the XTR encryption function, and/or the like) and/or the different ciphers (e.g., the AES cipher, the DES cipher, the triple DES cipher, the blowfish cipher, the twofish cipher, the threefish cipher, the IDEA cipher, the RC4 cipher, the TEA cipher, and/or the like). In some implementations, the user function may utilize the variety of operations (e.g., the substitution operation, the shifting operation, the XOR addition operation, the reverse operation, the isolate operation, the split operation, and/or the like), the parameters, and the values to cause encryption platform 220 to generate the encryption steps for the custom encryption function.

For example, the custom encryption function may include the following encryption steps: (1) divide original data into blocks with sizes mimicking a Fibonacci sequence; (2) for odd-numbered blocks, apply substitution with an substitution box (S-box) generated from an eighth character in a function executed on the original data, and after shifting the original data by three characters to the left five times, apply an XOR addition between right and left halves of a string; (3) for even-numbered blocks, apply an AES cipher, then a RC4 cipher, and then a blowfish cipher; (4) re-assemble the blocks into one string, identify prime numbers of more than five digits, assign a character to each five-digit prime number that appears in the string, and substitute each five-digit prime number string with the assigned character; and/or the like.

In some implementations, the custom encryption function may include information indicating IDs for the encryption steps, information indicating the encryption steps (e.g., one or more of the different encryption functions and/or one or more of the different ciphers), information indicating preceding encryption steps, information indicating succeeding encryption steps, information indicating data types for the encryption steps, information indicating requirements for the encryption steps, and/or the like. In some implementations, since the random function randomly selects the parameters and the values for the user function and the user function randomly selects the variety of operations, encryption platform 220 may create a different custom encryption function for each time a user utilizes client device 210 to access and communicate with the application provided by server device 240.

In this way, encryption platform 220 may utilize the user function, the parameters, and the values to generate the custom encryption function.

As further shown in FIG. 4, process 400 may include encrypting the custom encryption function (block 460). For example, encryption platform 220 may encrypt the custom encryption function. In some implementations, encryption platform 220 may utilize one or more of the different encryption functions (e.g., the RSA encryption function, the Diffie-Hellman encryption function, the DSA encryption function, the ElGamal encryption function, the ECC encryption function, the ECDSA encryption function, the XTR encryption function, and/or the like) and/or one or more of the different ciphers (e.g., the AES cipher, the DES cipher, the triple DES cipher, the blowfish cipher, the twofish cipher, the threefish cipher, the IDEA cipher, the RC4 cipher, the TEA cipher, and/or the like) to encrypt the custom encryption function. In some implementations, encryption platform 220 may utilize one or more other encryption techniques to encrypt the custom encryption function, such as a cryptographic hash function technique, a certificate-based encryption technique, and/or the like.

In this way, encryption platform 220 may encrypt the custom encryption function.

As further shown in FIG. 4, process 400 may include providing the encrypted custom encryption function to the client device and the server device to permit encrypted communications between the client device and the server device using the custom encryption function (block 470). For example, encryption platform 220 may provide the encrypted custom encryption function to client device 210 and server device 240 to permit encrypted communications between client device 210 and server device 240 using the custom encryption function. In some implementations, encryption platform 220 may provide the encrypted custom encryption function to client device 210 and server device 240, and client device 210 and server device 240 may receive the encrypted custom encryption function. In some implementations, the application provided by server device 240 may require secure communication of private information (e.g., financial information, personal information, and/or the like) between client device 210 and server device 240.

In order to protect the private information, client device 210 may decrypt the encrypted custom encryption function to generate the custom encryption function, and may encrypt the private information based on the custom encryption function. After encrypting the private information based on the custom encryption function, client device 210 may assign a null value to the custom encryption function so that the custom encryption function cannot be utilized again by client device 210. In some implementations, client device 210 may utilize the custom encryption function to encrypt communications between client device 210 and server device 240 during a session associated with the application. In such implementations, once the session associated with the application is terminated, client device 210 may assign the null value to the custom encryption function so that the custom encryption function cannot be utilized again by client device 210.

In some implementations, client device 210 may provide the encrypted private information to server device 240, and server device 240 may receive the encrypted private information. In some implementations, server device 240 may decrypt the encrypted custom encryption function (e.g., previously provided by encryption platform 240) to generate the custom encryption function, and may utilize the custom encryption function in reverse order (e.g., reverse the encryption steps of the custom encryption function) to decrypt the encrypted private information. In some implementations, the application provided by server device 240 may utilize the private information to perform a function associated with the application.

In this way, encryption platform 220 may provide the encrypted custom encryption function to client device 210 and server device 240 to permit encrypted communications between client device 210 and server device 240 using the custom encryption function.

In some implementations, encryption platform 220 may securely store the information described herein (e.g., the user credentials, the IP addresses of client devices 210, the random functions table, the user functions table, the encryption steps table, and/or the like) by encrypting the information described herein using an encryption technology. For example, the information described herein may be securely stored using symmetric-key (or single-key) encryption technology. Using symmetric-key encryption technology, a single key, which is shared by encryption platform 220 and server device 240, may be used to encrypt and decrypt the information described herein. Example symmetric-key technologies may include AES, DES, triple DES, twofish, blowfish, RC4, IDEA, and/or the like.

In some implementations, the information described herein may be securely stored using asymmetric-key (or public-key-private-key) encryption technology. Using asymmetric-key encryption technology, the information described herein may be encrypted with a private key, and decrypted with a public key, to verify that the information was encrypted using the corresponding private key. Example asymmetric-key encryption technologies may include DSA, RSA, the Diffie-Hellman key exchange, key serialization, asymmetric utilities, and/or the like.

In some implementations, the information described herein may be securely stored by applying a cryptographic hash function to the information. The cryptographic hash function may be used to verify integrity of files and/or messages, verify passwords, and/or the like. Example cryptographic hash functions may include secure hash algorithm 1 (SHA-1), secure hash algorithm 2 (SHA-2), secure hash algorithm 3 (SHA-3), message digest 5 (MD5), and/or the like.

In some implementations, the information described herein may be password-protected to prevent access to the information unless a particular password is provided. Alternatively, or additionally, some implementations may utilize certificate-based encryption to protect the information described herein. In some implementations, the certificate-based encryption may apply a combination of symmetric-key encryption and asymmetric-key encryption.

In some implementations, encryption platform 220 may utilize steganography to hide the information described herein inside other information. For example, encryption platform 220 may utilize steganography to hide the information described herein inside of audio files, video files, image files, document files, and/or the like.

In some implementations, encryption platform 220 may protect the information described herein while the information described herein is in transit from encryption platform 220 to client device 210 and/or server device 240. For example, encryption platform 220 may use an Internet protocol security (IPsec) technique to encrypt the information described herein while the information described herein is in transit.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Some implementations described herein may provide an encryption platform that provides a custom encryption function for communications between a client device and a server device. For example, the encryption platform may receive credentials of a user of a client device that is accessing an application associated with a server device, and may verify the user based on the credentials of the user. The encryption platform may retrieve a random function from a random functions data structure based on verifying the user, and may utilize the random function to randomly select parameters and values for a user function. The encryption platform may utilize the user function, the parameters, and the values to generate a custom encryption function, and may encrypt the custom encryption function. The encryption platform may provide the encrypted custom encryption function to the client device and the server device to permit encrypted communications between the client device and the server device using the custom encryption function.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
    one or more memories; and
    one or more processors, communicatively coupled to the one or more memories, configured to:
        provide application information to a client device and an encryption platform;
        receive, based on providing the application information to the client device, credentials of a user of the client device;
        receive, from the encryption platform, an encrypted custom encryption function to permit encrypted communication between the client device and the device using a custom encryption function,
            the encrypted custom encryption function being decrypted at the client device to create the custom encryption function,
            the custom encryption function being used to create encrypted form data at the client device, and
            the custom encryption function being assigned a null value based on the encrypted form data being created;
        provide, to the client device, an application form;
        receive, based on providing the application form to the client device, the encrypted form data;
        decrypt the encrypted custom encryption function to generate the custom encryption function; and
        utilize the custom encryption function to decrypt the encrypted form data.

2. The device of claim 1, where the application information comprises information indicating a location of an application, associated with the application information, at the device.

3. The device of claim 1, where the one or more processors are further to:
    determine, based on the credentials, whether the user is authorized to use an application associated with the application information.

4. The device of claim 1, where the one or more processors, when receiving the encrypted custom encryption function, are to:

receive the encrypted custom encryption function based on the encryption platform receiving the credentials from the client device.

5. The device of claim 1, where the application form includes a request for information associated with the user.

6. The device of claim 1, where the application form is encrypted to create the encrypted form data.

7. The device of claim 1, where the one or more processors are further to:
utilize form data, created based on decrypting the encrypted form data, to perform a function associated with an application,
the application being associated with the application information.

8. A method, comprising:
providing, by a device, application information to a client device and an encryption platform;
receiving, by the device based on providing the application information to the client device, credentials of a user of the client device;
receiving, by the device and from the encryption platform, an encrypted custom encryption function to permit encrypted communication between the client device and the device using a custom encryption function,
the encrypted custom encryption function being decrypted at the client device to create the custom encryption function,
the custom encryption function being used to create encrypted form data at the client device, and
the custom encryption function being assigned a null value based on the encrypted form data being created;
providing, by the device and to the client device, an application form;
receiving, by the device based on providing the application form to the client device, the encrypted form data;
decrypting, by the device, the encrypted custom encryption function to generate the custom encryption function; and
utilizing, by the device, the custom encryption function to decrypt the encrypted form data.

9. The method of claim 8, further comprising:
receiving an encryption key, stored in an external memory, from the encryption platform; and
where decrypting the encrypted custom encryption function comprises:
decrypting the encrypted custom encryption function using the encryption key.

10. The method of claim 8, where the application form is encrypted, using the custom encryption function, to create the encrypted form data.

11. The method of claim 8, further comprising:
utilizing form data, created based on decrypting the encrypted form data, to perform a function associated with an application,
the application being associated with the application information.

12. The method of claim 8, further comprising:
determining, based on the credentials, whether the user is authorized to use an application associated with the application information.

13. The method of claim 8, where the custom encryption function is based on a random function being utilized to select a parameter and a value.

14. The method of claim 8, where the custom encryption function is further based on the credentials.

15. A non-transitory computer-readable medium storing instructions, the instructions comprising:
one or more instructions that, when executed by one or more processors, further cause the one or more processors to:
provide application information to a client device and an encryption platform;
receive, based on providing the application information to the client device, credentials of a user of the client device;
receive, from the encryption platform, an encrypted custom encryption function to permit encrypted communication with the client device using a custom encryption function,
the encrypted custom encryption function being decrypted at the client device to create the custom encryption function,
the custom encryption function being used to create encrypted form data at the client device, and
the custom encryption function being assigned a null value based on the encrypted form data being created;
provide, to the client device, an application form;
receive, based on providing the application form to the client device, the encrypted form data;
decrypt the encrypted custom encryption function to generate the custom encryption function; and
utilize the custom encryption function to decrypt the encrypted form data.

16. The non-transitory computer-readable medium of claim 15, where the one or more instructions, that cause the one or more processors to receive the encrypted custom encryption function, cause the one or more processors to:
receive the encrypted custom encryption function based on the encryption platform receiving the credentials from the client device.

17. The non-transitory computer-readable medium of claim 15, where the one or more instructions, when executed by the one or more processors, further cause the one or more processors to:
utilize form data, created based on decrypting the encrypted form data, to perform a function associated with an application,
the application being associated with the application information.

18. The non-transitory computer-readable medium of claim 15, where the one or more instructions, when executed by the one or more processors, further cause the one or more processors to:
receive an encryption key from the encryption platform; and
where the one or more instructions, that cause the one or more processors to decrypt the encrypted custom encryption function, cause the one or more processors to:
decrypt the encrypted custom encryption function using the encryption key.

19. The non-transitory computer-readable medium of claim 15, where the application form is encrypted, using the custom encryption function, to create the encrypted form data.

20. The non-transitory computer-readable medium of claim 15, where the custom encryption function is based on the credentials and a random function.

* * * * *